(12) United States Patent
Rehme

(10) Patent No.: US 6,854,757 B2
(45) Date of Patent: Feb. 15, 2005

(54) SHOCK ABSORBING TRAILER HITCH

(75) Inventor: Mark L. Rehme, Rush Springs, OK (US)

(73) Assignee: Tom and Mark Uniques, Inc, Forsuth, GA (US)

( * ) Notice: Subject to any disclaimer, the term of this patent is extended or adjusted under 35 U.S.C. 154(b) by 2 days.

(21) Appl. No.: 10/438,460

(22) Filed: May 14, 2003

(65) Prior Publication Data

US 2003/0214116 A1 Nov. 20, 2003

Related U.S. Application Data

(60) Provisional application No. 60/380,701, filed on May 14, 2002.

(51) Int. Cl.[7] .................................................. B60D 1/30
(52) U.S. Cl. ..................... 280/488; 280/441.2; 280/484
(58) Field of Search ................................. 267/141, 136, 267/201, 203, 293; 280/484, 439, 440, 441.2, 483, 488

(56) References Cited

U.S. PATENT DOCUMENTS

| | | | | |
|---|---|---|---|---|
| 3,892,398 A | * | 7/1975 | Marsh | 267/153 |
| 3,904,226 A | * | 9/1975 | Smalley | 280/486 |
| 4,460,194 A | * | 7/1984 | McGhie et al. | 280/443 |
| 4,632,371 A | * | 12/1986 | Wirges et al. | 267/64.28 |
| 5,324,061 A | * | 6/1994 | Lay | 280/417.1 |
| 5,421,599 A | * | 6/1995 | Maines | 280/406.2 |
| 5,683,094 A | * | 11/1997 | Gullickson | 280/485 |
| 5,868,415 A | * | 2/1999 | Van Vleet | 280/483 |
| 5,975,553 A | * | 11/1999 | Van Vleet | 280/483 |

* cited by examiner

Primary Examiner—Daniel G. DePumpo
(74) Attorney, Agent, or Firm—Sand & Sebolt

(57) ABSTRACT

A shock absorbing trailer hitch generally includes a socket adapted to lock onto a ball connected to the towing vehicle. The socket is connected to a lower support member which supports the bottom of a shock absorbing assembly. An inner tube extends up from the socket and lower tube through the shock absorbing assembly. The upper portion of the shock absorbing assembly is connected to an upper support member that is connected to the towed vehicle. A bearing is secured to the upper tube that slidably but non-rotatably receives the upper portion of the inner tube. The shock absorbing assembly includes rubber springs that absorb the forces experienced by the trailer hitch.

17 Claims, 5 Drawing Sheets

SHOCK ABSORBING TRAILER HITCH

CROSS-REFERENCE TO RELATED APPLICATIONS

This application claims priority from U.S. provisional application Ser. No. 60/380,701 filed May 14, 2002; the disclosures of which are incorporated herein by reference.

BACKGROUND OF THE INVENTION

1. Technical Field

The present invention generally relates to trailer hitches and, more particularly, to shock absorbing trailer hitches. Specifically, the present invention relates to a trailer hitch that minimizes the transmission of shock forces between a towing vehicle and the towed vehicle. A shock absorber assembly is provided between the elements of the trailer hitch that are attached to the towed vehicle and the towing vehicle to absorb the shock forces.

2. Background Information

Various types of hitches and towing configurations are known in the art. Three typical trailer hitch configurations are generally known as receiver hitches, gooseneck hitches, and fifth wheel hitches. A problem common to all of these hitches, but particularly evident in the gooseneck hitch, is the transmission of forces from the towed vehicle to the towing vehicle. Users of trailer hitches desire a device that minimizes the transfer of these forces.

A receiver hitch typically extends beyond the rear bumper of the towing vehicle. Gooseneck and fifth wheel hitches are disposed in the bed of the towing vehicle in front of the rear bumper. Rigid hitches transfer forces to the towing vehicle that are disruptive to the driver and can negatively influence the ride, comfort, and/or handling of the towing vehicle.

Different cushioning devices are known in the art for reducing the transmission of forces from the towed vehicle to the towing vehicle. One such device is disclosed in U.S. Pat. No. 4,077,650 wherein a compressible element is disposed between the two hitch members. More recently, air springs have been used to provide the cushioning force as shown in U.S. Pat. No. 5,836,603. Although these devices are useful for reducing shock forces transmitted from the towed vehicle to the towing vehicle, room for improvement remains in the art. For instance, air springs are relatively expensive and require maintenance. The trailer hitch devices utilizing air springs are often heavy and cannot be easily shipped and installed. Air springs are stiff when the trailer is unloaded. They may require a secondary dampener and a supply of air. These devices also have moving parts which can wear after extended use. In view of the foregoing, the art desires a shock absorbing trailer hitch that is light-weight, simple to use, reliable, and easy to install.

BRIEF SUMMARY OF THE INVENTION

The invention provides a shock absorbing trailer hitch for use between a towing vehicle and a towed vehicle. The hitch includes a first support member adapted to engage the towing vehicle; a second support member adapted to engage the towed vehicle; a shock absorbing assembly connecting the first support member to the second support member; the shock absorbing assembly including at least one spring member; and the first support member engaging the second support member in a manner that allows sliding movement between the first and second support members without allowing rotational movement between the first and second support members.

The invention also provides a shock absorbing trailer hitch including a first support member adapted to engage the towing vehicle; a second support member adapted to engage the towed vehicle; a shock absorbing assembly connecting the first support member to the second support member; the shock absorbing assembly including at least one non-pressurized spring; and the first support member engaging the second support member in a manner that allows sliding movement between the first and second support members without allowing rotational movement between the first and second support members.

The hitch of the invention is lightweight and compact while allowing forces between the towing and towed vehicles to be effectively absorbed by the shock absorbing assembly of the hitch.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
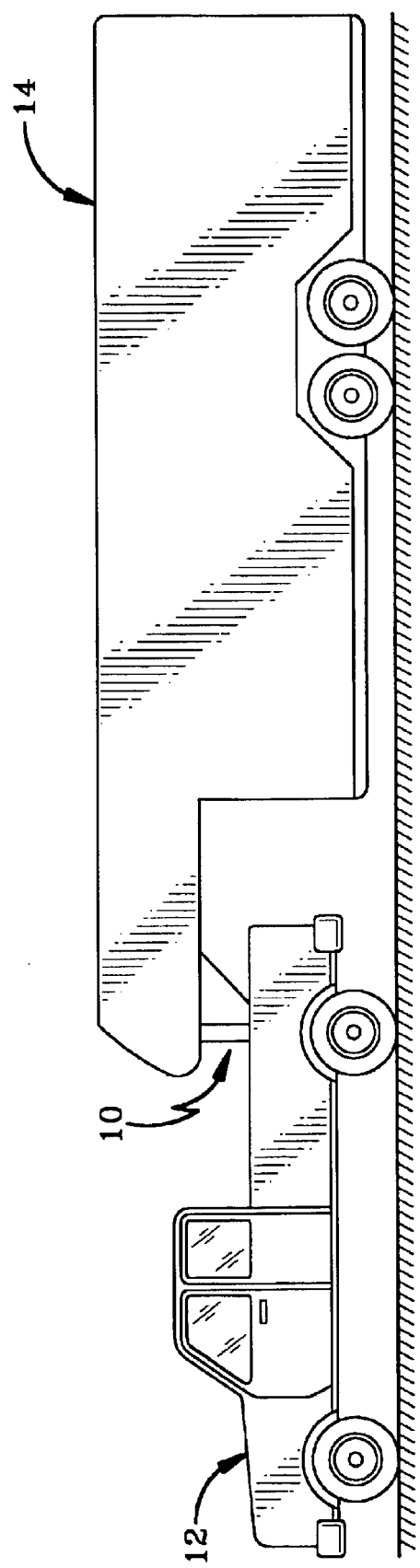
FIG. 1 is a side elevation view of a towing vehicle towing a towed vehicle with a gooseneck embodiment of the hitch of the present invention.
Figure 2:
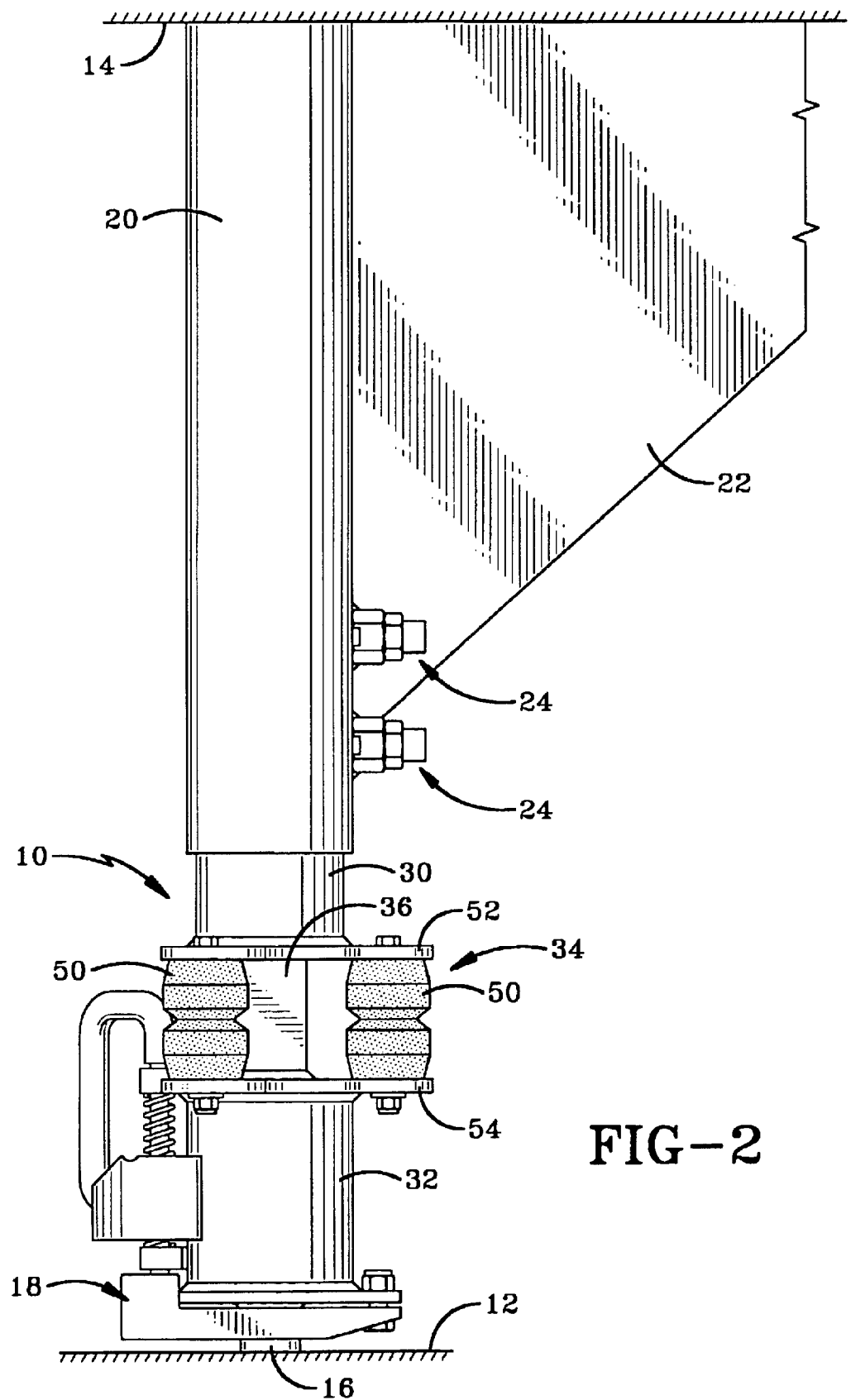
FIG. 2 is a side elevation of the hitch connected to the towed and towing vehicles.
Figure 3:
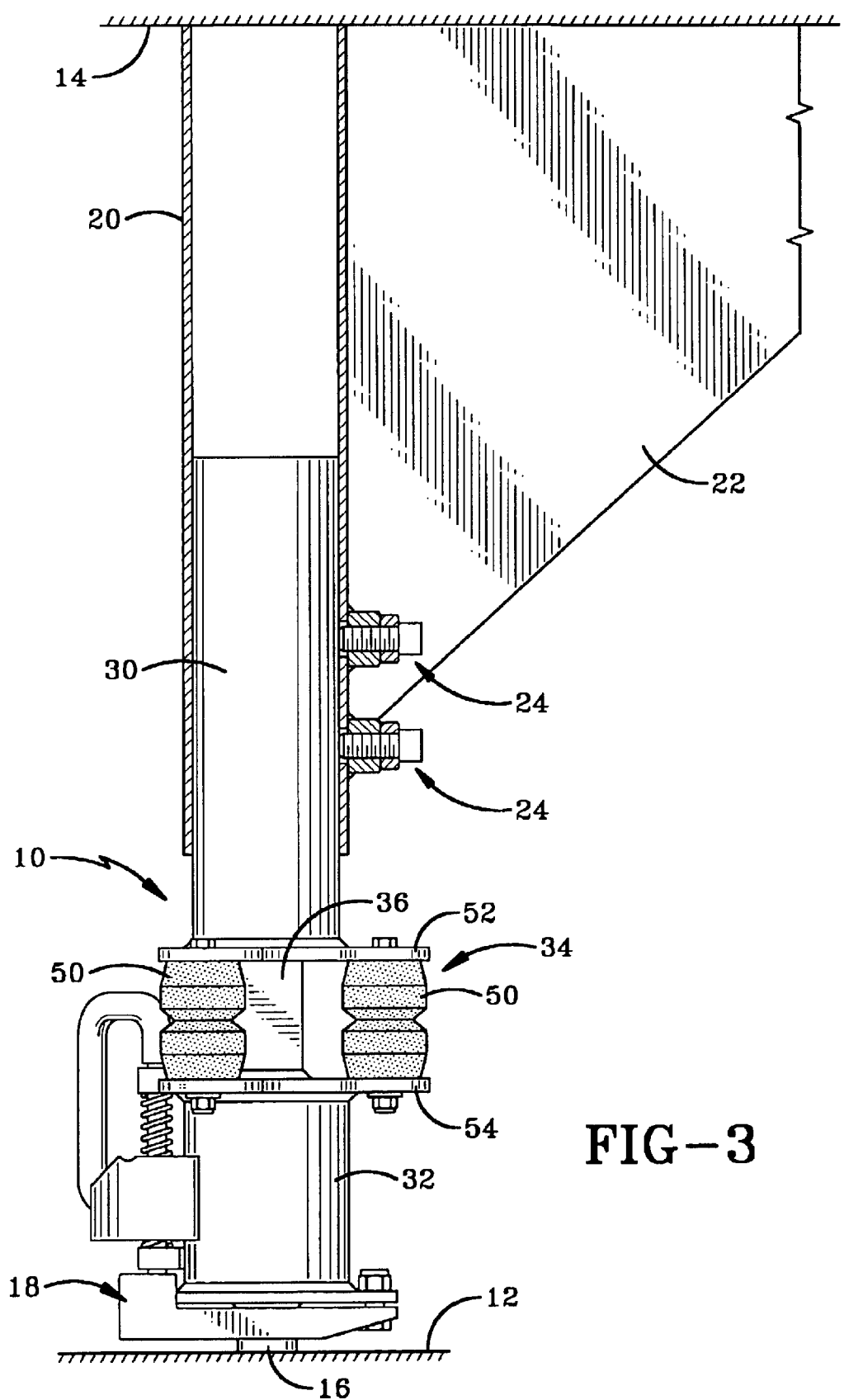
FIG. 3 is a side view similar to FIG. 2 with portions in section.
Figure 4:
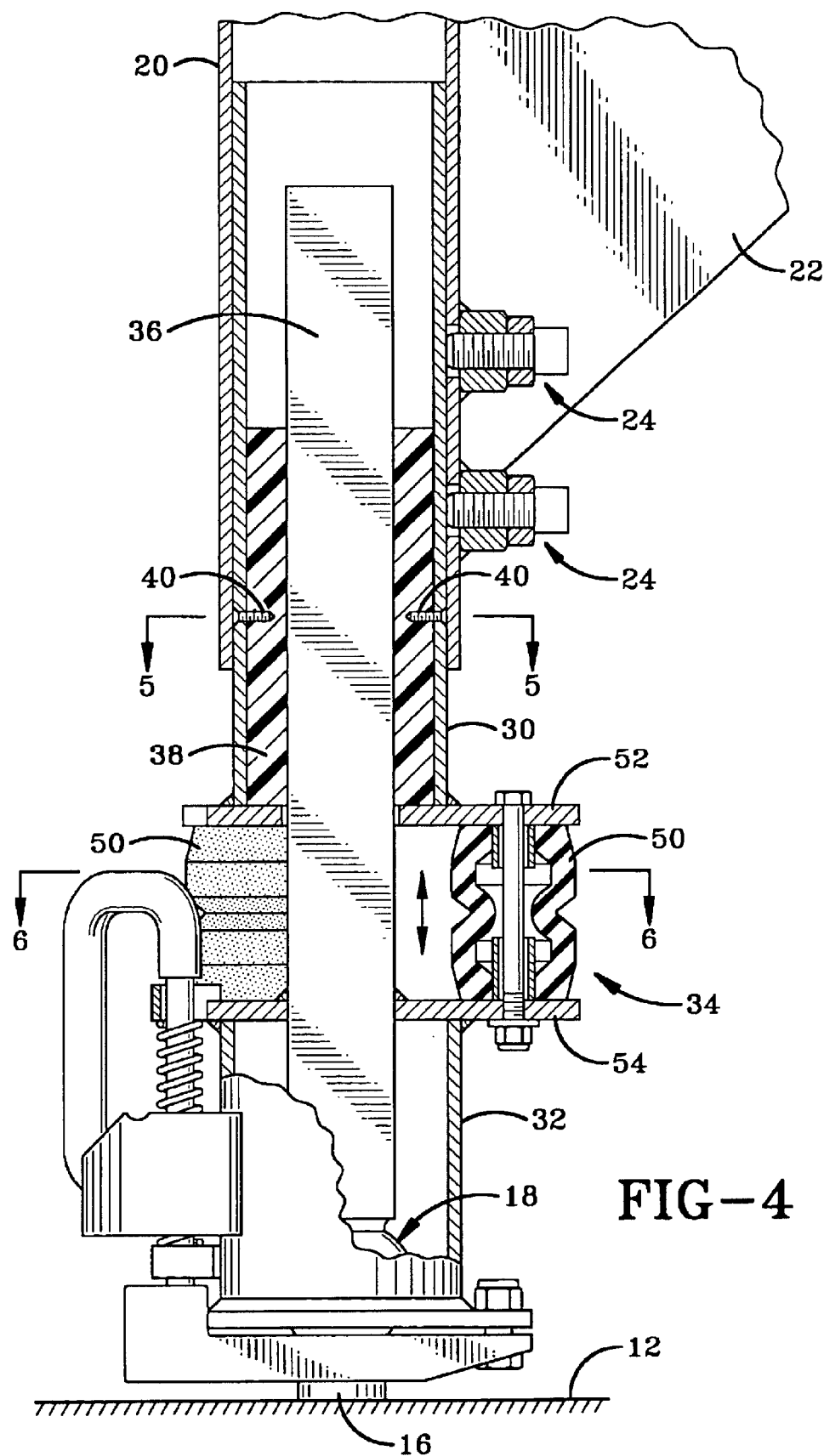
FIG. 4 is a side view similar to FIG. 2 with other portions in section.
Figure 5:
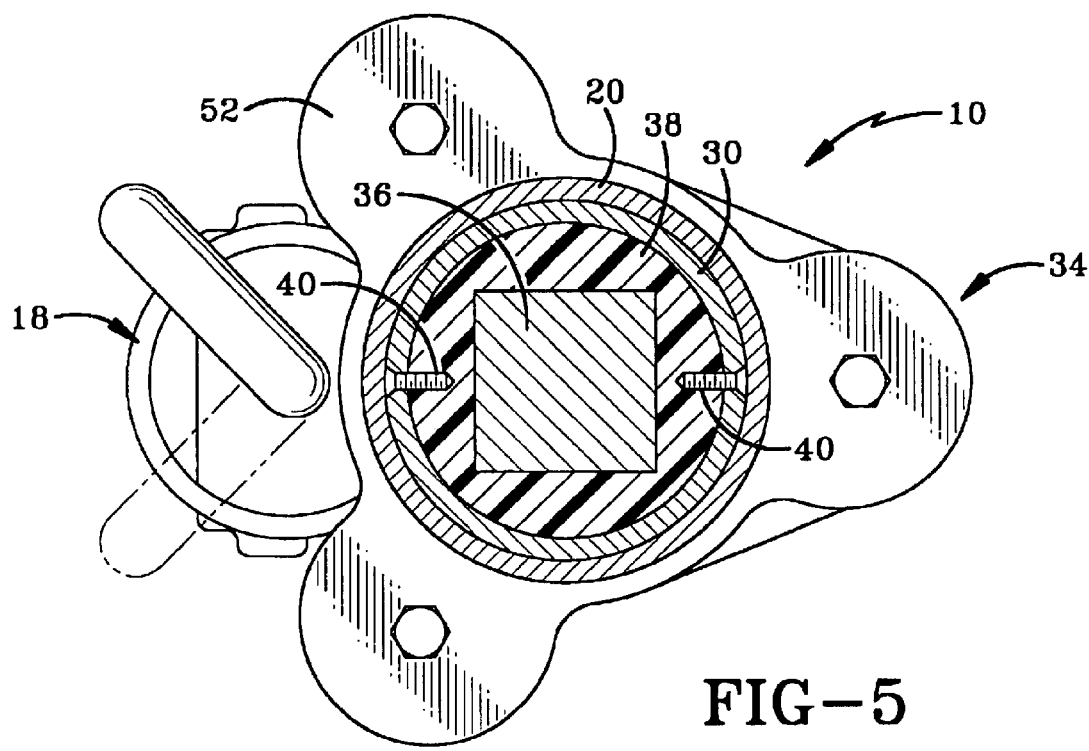
FIG. 5 is a section view taken along line 5—5 of FIG. 4.
Figure 6:
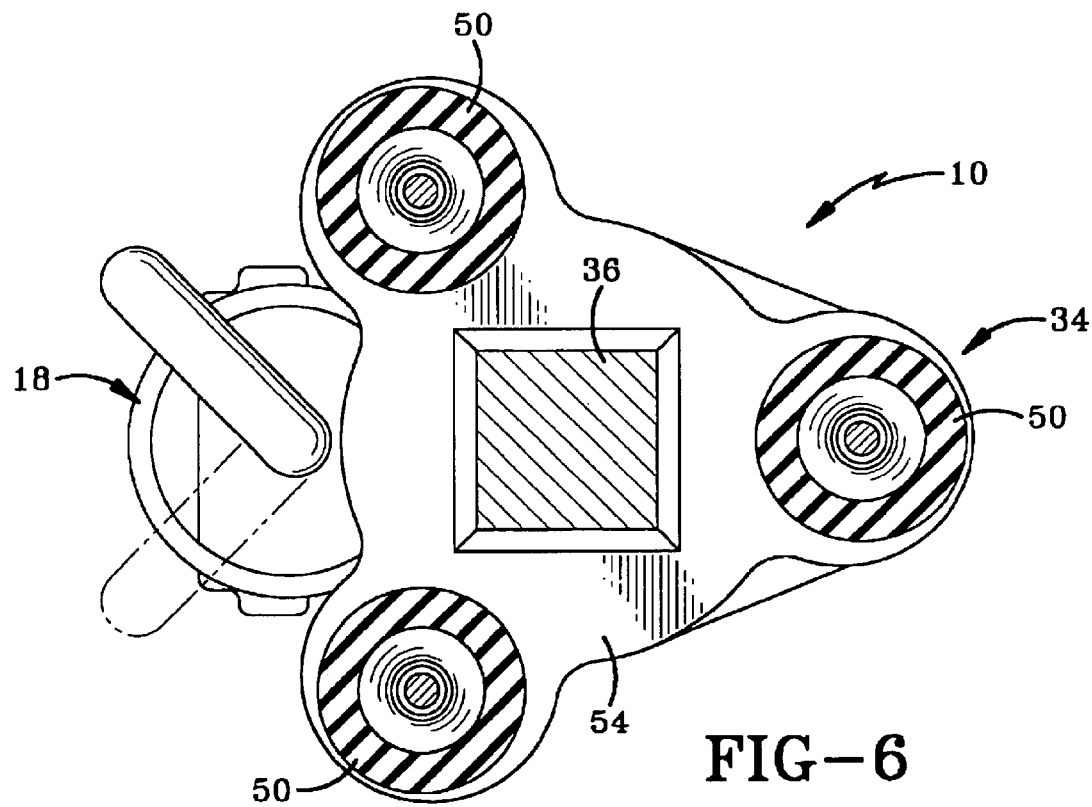
FIG. 6 is a section view taken along line 6—6 of FIG. 4.

An exemplary embodiment of the shock absorbing trailer hitch of the invention is indicated generally in the accompanying drawings by the numeral 10. FIG. 1 depicts a towing vehicle 12 connected to a towed vehicle 14 with hitch 10. In FIG. 1, hitch 10 is configured in the gooseneck configuration. Those of ordinary skill in the art will recognize that hitch 10 may also be configured in a fifth wheel configuration or a receiver configuration. In the gooseneck configuration depicted in FIG. 1, the hitch ball 16 is disposed in the bed of towing vehicle 12 with hitch 10 having the typical locking assembly 18 with a socket arrangement that locks onto ball 16 to connect towing vehicle 12 to hitch 10. Hitch 10 is configured to absorb forces experienced by hitch 10. Hitch ball 16 is depicted for the purpose of providing an example with other hitch structures known in the art—for example, a king pin, a welded fifth wheel connection, or a pinte hitch.

Towed vehicle 14 includes a hitch tube 20 that is securely fastened to the front of towed vehicle 14 by welds and/or bolts. A strengthening flange 22 may be provided between hitch tube 20 and the frame of towed vehicle 14. Hitch tube 20 is designed to travel in a substantially vertical position and is typically in the form of a hollow rectangular or round tube. Hitch tube 20 typically includes a pair of clamping bolts 24 that are used to clamp the upper portion of hitch 10 to hitch tube 20 in an adjustable manner. Each clamping bolt 24 may include a threaded nut welded to the exterior of hitch tube 20, a threaded bolt that threadedly engages the threaded nut, and a locking device that locks the position of the bolt with respect to the nut when the bolt is in the clamped position. Hitch tube 20 defines openings so that the inner ends of the bolts may pass through the exterior wall of hitch tube 20 to engage the upper portion of hitch 10.

Hitch 10 generally includes an upper support member 30, a lower support member 32, and a shock absorbing assembly 34 connecting upper support member 30 to lower support member 32. The connection between members 30 and 32 is sliding and non-rotating. In the exemplary embodiment of the invention depicted in the drawings, support members 30 and 32 are in the form of tubes. Tubes 30 and 32 may have circular or non-circular cross sections. Support members 30 and 32 may also be solid members or other structural framing members adapted to be connected to vehicles 12 and 14 as needed.

In the exemplary embodiment, upper tube 30 is also connected to lower tube 32 by means of an inner tube 36 that is fixed with respect to lower tube 32. Inner tube 36 may be directly connected to lower tube 32 or connected by way of socket 18 (which is securely fastened to lower tube 32). Inner tube 36 slides against a bearing 38 that is securely fastened to upper tube 30. Hitch 10 thus allows upper tube 30 to slide linearly with respect to lower tube 32 but does not allow upper tube 30 to rotate with respect to lower tube 32. Hitch 10 rotates with respect to towed vehicle 14 in the manner of a typical trailer hitch by allowing socket 18 to rotate with respect to ball 16.

Upper tube 30 is configured to slide into hitch tube 20 upon installation such that upper tube 30 cannot rotate with respect to hitch tube 20. Upper tube 30 has a length sufficient to pass both clamping bolts 24 while allowing for a range of height adjustment. In the preferred embodiment of the invention, upper tube 30 has a 4 inch outer diameter with a 3½ inch inside diameter and has a length of 13⅝ inches. The lower end of upper tube 30 is connected to the upper end of shock absorbing assembly 34 by appropriate connectors such as bolts, screws, or a weld.

Upper tube 30 carries bearing 38 and is connected to bearing 38 with a plurality of connectors 40. Connectors 40 may be screws that pass through openings defined by upper tube 30 and engage the body of bearing 38. Connectors may also be a suitable adhesive disposed between bearing 38 and the inner surface of upper tube 30. Mechanical connectors are preferred and may be in the form of rivets, screws, bolts, pins, or the like. Bearing 38 may have an outside diameter of slightly less than 3½ inches so that it fits snugly inside tube 30. Bearing 38 defines an opening that slidably receives a portion of lower support member 30 such as inner tube 36. In the exemplary embodiment, bearing 38 defines a 2 inch square longitudinal opening. Bearing 38 may have an overall length of 7 inches. Bearing 38 is a self-lubricating type of bearing that requires little or no maintenance over its useful life. Bearing 38 presents a large bearing surface to inner tube 36.

Inner tube 36 extends rigidly from lower tube 32 and the lower end of shock absorbing assembly 34. The upper portion of inner tube 36 extends up into upper tube 30 and is slidably received in bearing 38. The upper end of inner tube 36 preferably extends beyond the upper end of bearing 38 so that as much bearing surface as possible is used. Inner tube 36 has a non-circular cross-section that matches the non-circular opening defined by bearing 38. In the embodiment of the invention described for the purpose of providing an example in this specification, inner tube 36 has a square cross-section that is 2 inch by 2 inch. This square cross-section of inner tube 36 is slidably received in the opening defined by bearing 38. Upper tube 30 and thus hitch tube 20 may not rotate with respect to lower tube 32 because of the complementary, non-circular cross-sections of inner tube 36 and the opening in bearing 38. Inner tube 36 is rigidly connected to lower tube 32 and shock absorbing assembly 34 by welds, bolts, screws, or other appropriate connectors. In the exemplary embodiment of the invention, lower tube 32 includes socket 18 with the lower end of inner tube 36 being welded to the upper portion of socket 18 that is disposed within lower tube 32. Socket 18 is connected to the lower end of lower tube 32 by a weld or a plurality of bolts. The structure and operation of socket 18 is known in the art.

Shock absorbing assembly 34 is connected to the lower end of upper tube 30 and to the upper end of lower tube 32. Shock absorbing assembly 34 includes at least one but preferably three or more springs 50 that cushion shock forces between upper tube 30 and lower tube 32. Each spring may have a variable spring rate so that assembly 34 provides desirable cushioning properties when towed vehicle 14 is empty or loaded. Springs 50 may be fabricated from a wide variety of materials. In the preferred embodiment of the invention, springs 50 are non-pressurized rubber springs. In one embodiment, Aeon®, rubber springs are used that allow a variable response. Springs 50 are supplied in different stiffnesses for different tongue weights that are common in the trailer industry. The end user may own different sets of springs for different trailer weights and can easily change springs 50 into and out of hitch 10. For instance, springs 50 may be supplied at any of a variety of durometer ratings such as 55, 65, or 75 durometer rating in response to different tongue weights.

Springs 50 may be evenly disposed about inner tube 36. Upper 52 and lower 54 plates may be provided to mount springs 50 to upper tube 30 and lower tube 32. Each plate 52 and 54 includes an opening sized slightly larger than the outer dimension of inner tube 36 so that inner tube 36 may pass through plates 52 and 54.

Springs 50 have no moving parts and may provide a wide degree of travel between plates 52 and 54. In the exemplary embodiment, springs 50 may provide 2 inches to 4 inches of travel between plates 52 and 54. Rubber springs 50 are not pressurized and thus will not leak. Springs 50 have a long useful life, are easy to replace, and are relatively inexpensive.

Hitch 10 may thus be configured to fit essentially all types of trailers utilizing hitch tubes 20. In other embodiments of the invention, hitch 10 may be configured to work with a receiver-type ball hitch or a fifth wheel hitch. Hitch 10 is easy to install because it is installed in the manner of existing hitches without separate and distinct installation steps. Hitch 10 may be configured for various trailer tongue weights by changing the stiffness of springs 50 or by changing the number of springs 50 present between plates 52 and 54. For example, plates 52 and 54 may be configured to hold two, three, four, five, or six springs with the tongue weight determining the number of springs used between plates 52 and 54. In use, hitch 10 absorbs shocks transferred between towing vehicle and towed vehicle 14 and thus lessens driver fatigue, reduces wear on towing vehicle 12, and reduces wear on towed vehicle 14. When horses are being transported in towed vehicle 14, hitch 10 reduces the fatigue experience by the horses in towed vehicle 14. Hitch 10 also improves the handling of towing vehicle 12.

Another significant advantage with hitch 10 is that it may be disassembled and shipped in a compact, light-weight configuration that allows standard UPS/Fed Ex shipping. Hitch 10 may be configured to have a total weight of less than 65 pounds which is less than the maximum shipping weight for UPS or Fed Ex. The overall shipping dimensions may be less than 10"×10"×35" when hitch 10 is shipped in an assembled condition. Hitch 10 requires little or no maintenance because springs 50 are maintenance free and bearing 38 is maintenance free. Hitch 10 also has few moving parts.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A shock absorbing trailer hitch for use between a towing vehicle and a towed vehicle; the shock absorbing trailer hitch comprising:
   a first support member adapted to engage the towing vehicle;
   a second support member adapted to engage the towed vehicle;
   a shock absorbing assembly connecting the first support member to the second support member;
   the shock absorbing assembly including at least one spring member;
   the first support member engaging the second support member in a manner that allows sliding movement between the first and second support members without allowing rotational movement between the first and second support members; and
   the first support member includes an inner member that extends through the shock absorbing assembly into the second support member; each spring member of the shock absorbing assembly being disposed radially outwardly of the inner member of the first support member.

2. The hitch of claim 1, wherein the second support member slides against the inner member.

3. The hitch of claim 2, further comprising a bearing disposed intermediate the inner member and the second support member.

4. The hitch of claim 3, wherein the bearing is self-lubricating.

5. The hitch of claim 3, wherein the bearing defines a non-circular opening; the inner member having a non-circular cross-section complementary to the shape of the non-circular opening defined by the bearing; the inner member extending into the non-circular opening defined by the bearing.

6. The hitch of claim 1, wherein the hitch has a total weight of less than 65 pounds.

7. The hitch of claim 1, wherein the spring is a non-pressurized rubber spring.

8. The hitch of claim 7, wherein the spring has a variable spring rate.

9. The hitch of claim 1, wherein the hitch may be used in one of a receiver, goose neck, and fifth wheel hitch configuration.

10. The hitch of claim 1, wherein each spring member is connected to the first and second support members with a connector; the connector extending between the first and second support members.

11. The hitch of claim 10, wherein a plate extends radially outwardly from each of the upper and lower support members; the shock absorbing assembly including a plurality of spring members disposed between the plates.

12. A shock absorbing trailer hitch for use between a towing vehicle and a towed vehicle; the shock absorbing trailer hitch comprising:
   a first support member adapted to engage the towing vehicle;
   a second support member adapted to engage the towed vehicle;
   a shock absorbing assembly connecting the first support member to the second support member;
   the shock absorbing assembly including at least one spring member; and the first support member engaging the second support member in a manner that allows sliding movement between the first and second support members without allowing rotational movement between the first and second support members; and
   a bearing carried by the second support member; the bearing being a separate element than the second support member; the first support member slidingly engaging the bearing; and
   the bearing defining a non-circular opening; the first support member slidingly disposed in the non-circular opening of the bearing; the engagement between the first support member and the bearing preventing radial movement between the first support member and the second support member.

13. The hitch of claim 12, wherein the first support member extends entirely through the non-circular opening defined by the bearing.

14. The hitch of claim 12, wherein the bearing is self-lubricating.

15. A shock absorbing trailer hitch for use between a towing vehicle and a towed vehicle; the shock absorbing trailer hitch comprising:
   a first support member adapted to engage the towing vehicle;
   a second support member adapted to engage the towed vehicle;
   a shock absorbing assembly connecting the first support member to the second support member;
   the shock absorbing assembly including at least three non-pressurized rubber springs;
   the first support member engaging the second support member in a manner that allows sliding movement between the first and second support members without allowing rotational movement between the first and second support members;
   the rubber springs being evenly disposed about the shock absorbing member; and
   the first support member including an inner member extending up through the shock absorbing member to slidably engage the second support member.

16. The hitch of claim 15, further comprising a bearing connected to the second support member; the inner member slidably engaging the bearing.

17. The hitch of claim 15, wherein the spring has a variable spring rate designed to respond to loaded and unloaded conditions in the towed vehicle.

* * * * *

UNITED STATES PATENT AND TRADEMARK OFFICE
CERTIFICATE OF CORRECTION

PATENT NO. : 6,854,757 B2 Page 1 of 1
DATED : February 15, 2005
INVENTOR(S) : Mark L. Rehme It is certified that error appears in the above-identified patent and that said Letters Patent is hereby corrected as shown below:

<u>Title page,</u>
Item [73], Assignee should read -- Tom and Mark Uniques, LLC
Forsyth, GA --.

Signed and Sealed this

Eleventh Day of April, 2006

JON W. DUDAS
*Director of the United States Patent and Trademark Office*